April 9, 1957
C. R. STELLJES
2,788,101
CLUTCH WITH UNDER CUT TEETH
Filed March 28, 1951
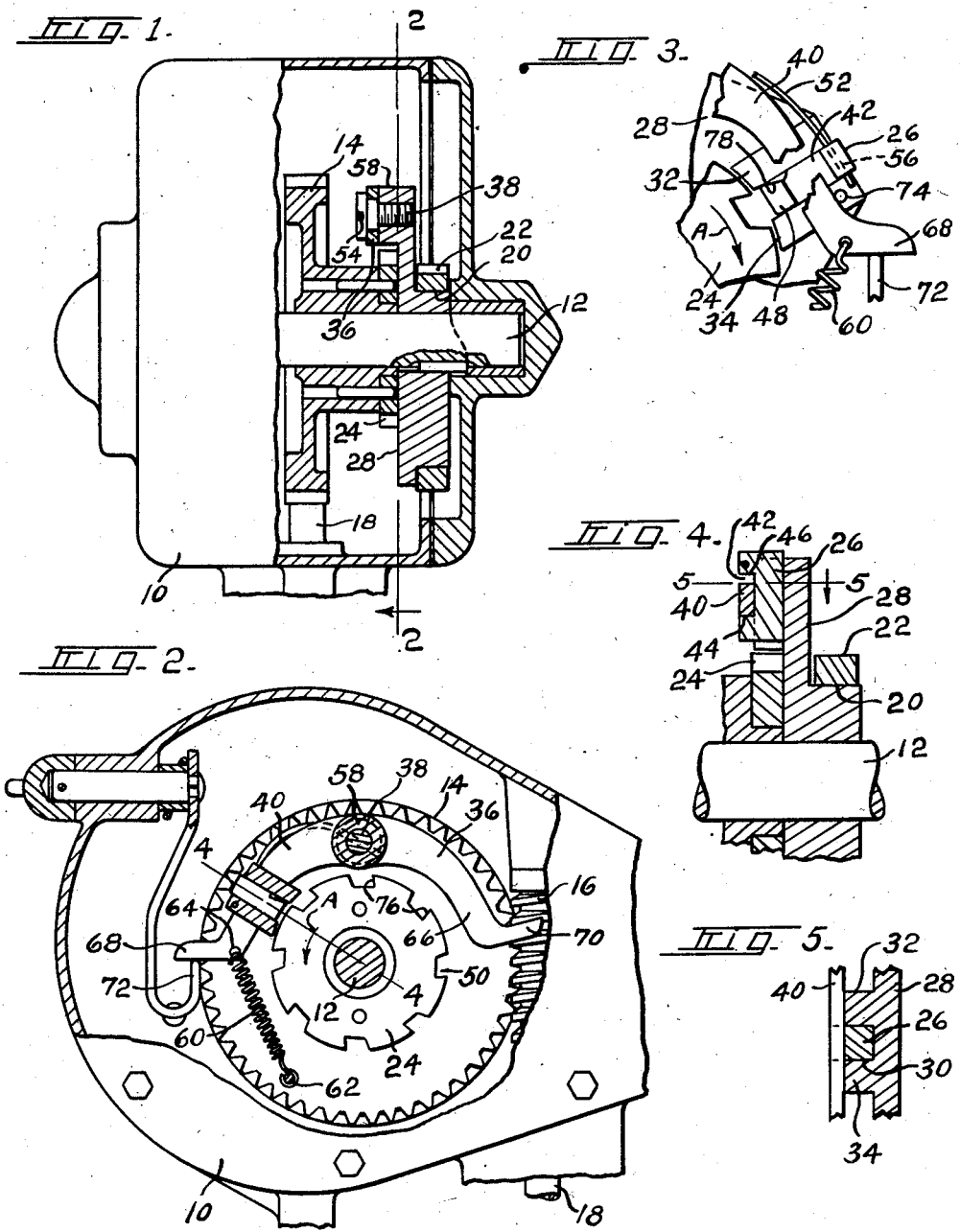
INVENTOR
CHARLES R. STELLJES
BY
ATTORNEY United States Patent Office 2,788,101
Patented Apr. 9, 1957

2,788,101
CLUTCH WITH UNDER CUT TEETH

Charles R. Stelljes, Fayetteville, N. Y., assignor, by mesne assignments, to The Murray Corporation of America, Detroit, Mich., a corporation of Delaware Application March 28, 1951, Serial No. 217,919

2 Claims. (Cl. 192—28)

This invention relates to clutches, and more particularly to a clutch construction adapted for use in domestic appliances such as ironing machines.

In Geldhof Patent 2,056,666, there is shown a domestic ironing machine having an ironing element movable toward and away from a padded roll, and in which the movement of the ironing element is effected through power derived from a continuously rotating roll drive mechanism. In order to move the element to either one of the end positions, a clutch is employed including a notched driving wheel and a driven notch-engaging bolt, control over the engagement of which is provided for at points a half revolution apart, and subject to manually actuated stop means. The construction shown has been utilized as a positive means for deriving power for a half revolution of the driven element, the clutch being adapted to be positively engaged and positively released upon the commencement of and completion of a half revolution of the driven element, by reason of the movement of the radially slidable bolt carried by the driven member into and out of engagement with the notched driving wheel.

The present invention relates to an improvement over the construction shown in the aforesaid patent, wherein there is provided means for assuring that the bolt, when in engagement with a notch of the driving element, is in full engagement and retained in full engagement by reason of the torque transmitted through the clutch. More particularly, the invention has to do with providing undercut notches and a bolt having an undercut face whereby the torque delivered through the clutch will exert a force tending to hold or move the bolt to a full engagement position. The invention further is directed to providing an arrangement in which partial engagement of the bolt with the driving notched member is avoided to the end that wear caused by the bolt slipping from the notch is avoided, together with the imperfect and faulty action resulting from such wear. The invention is accordingly directed to the provision of a clutch of the type described, wherein the action is positive and the possibility of wear reduced to a minimum.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation, partly in section, of the clutch;

Figure 2 is a view partly in section and partly in end elevation, the section being taken substantially on the line 2—2 of Figure 1;

Figure 3 is a fragmentary end view of the bolt and notched wheel as seen from the left hand side of Figure 1;

Figure 4 is a section taken substantially on the line 4—4 of Figure 2; and

Figure 5 is a section taken substantially on the line 5—5 of Figure 4.

Referring to the drawings, and particularly Figures 1 and 2, there is shown a casing 10 in which there is journaled a horizontal shaft 12. Freely rotatably mounted upon the shaft is a worm wheel 14 driven by a worm 16, the shaft 18 of which may be directly connected to a driving motor. In ordinary practice, the worm gear 14 rotates continuously and is adapted through a clutch or other arrangement, not shown, to drive the roll of an ironing machine. Such construction may be of the type shown in Ringer Patent 2,083,505. On the shaft 12 is mounted an eccentric 20 adapted to actuate a yoke 22, the yoke being connected to a rock shaft operating the ironing element. By rotating the eccentric 20 through a half revolution, the yoke 22 and its rock shaft are moved from one end position to the other, one end position being that wherein the ironing element is engaged with the ironing roll under ironing pressure, and the other end position being where the ironing element is spaced from the roll, in the manner indicated in the aforesaid Ringer patent.

In order to rotate the eccentric 20 through successive half revolutions and to cause the same to stop in the end position shown in Figure 1, or the other end position 180° therefrom, a clutch is provided adapted to drivably connect the eccentric to the worm wheel 14 for angular movement of approximately a half revolution at a time. Such clutch comprises a notched disk or wheel 24 drivably connected to the worm wheel 14, and a locking bolt 26 carried upon a face plate 28 formed integrally with the eccentric 20, the locking bolt 26 being slidably positioned for radial movement in a radially extending groove 30 formed by spaced guides 32 and 34.

Pivotally mounted upon the face plate 28 is an arcuate lever 36 eccentrically pivoted upon a pivot screw 38, such pivot screw being circumferentially displaced from the bolt groove 30. The lever 36 has an arm 40 extending across the guides 32 and 34, and extends across a notch 42 in the bolt 26. The notch 42 has opposite inner and outer end walls 44 and 46 spaced apart a distance substantially wider than the width of the lever arm 40 to afford lost motion. It will appear that upon rocking of the lever 40 on its pivot 38, the bolt 26 may be moved radially outward or radially inward so as to engage the inner end 48 thereof with a notch such as 50 of the notched wheel 24. The bolt 26 is resiliently urged toward an outward position by a wire spring 52, one end of which is fixed in a diametrically extending notch 54 in the head of the screw pivot 38, the other end extending through an aperture 56 in the outer end of the bolt 26. The arrangement is such that the wire spring tends to maintain the pivot screw tight in its threaded engagement in the boss 58 of the face plate 28.

The lever arm 40 of the lever 36 is provided with a coil spring 60 extending between a pin 62 on the face plate 28 and an aperture 64 adjacent the end of the lever arm. The spring 60 is adapted to normally rock the lever 40 so as to cause the bolt 26 to engage one of the notches 50, and overpower the urge of the wire spring 52.

The lever 36 may have an oppositely extending arm 66 and the arms 40 and 66 terminate in substantially radially extending end pieces 68 and 70, the end pieces being adapted to engage a manually shiftable stop member 72, which, when placed in the path of either radial extension 68 or 70, will cause the lever 36 to rock against the spring 60 and move the bolt outwardly out of engagement of the notched wheel. The lever 36 will thus be held in an end position as determined by the stop pin 74 (see Figure 3). At the same time, the bolt will be moved to its outermost position by the wire spring 52, such position being shown in Figure 3.

By manually swinging the stop 72 out of the path of either of the radial extensions 68 and 70, the lever 36 is caused to rock by the tension of the spring 60, so as to cause the bolt 26 to move radially inward and engage a notch of the notched wheel 24. In order to assure full engagement of the bolt with the notched wheel 24, and to prevent the notch from making only partial engagement, the notches 50, and particularly the driving faces 76 thereof, are inclined at a substantial angle to a radius passing through the center of each respective notch, and the driving face 78 of the bolt 26 is correspondingly inclined so that when the bolt is in full engagement within one of the notches 50, the face 78 provides a flat driving contact with a driving face 76 of one of the notches 50 of the wheel 24.

By reason of the incline thus provided, the driving torque which in the arrangement shown is always in the same direction, rotation being in the direction of the arrow A, will tend to draw the bolt into the depth of the notch and to hold the same in full engagement. Such driving torque will be sufficient to assure complete movement of the bolt to the innermost end of its radial movement, and to assure immediate and positive driving relation the instant such driving surface 78 of the bolt contacts any part of a driving face 76 of the particular notch engaged. The effect actually results from the angle between the driving face and the line of movement of the bolt.

It will be observed that at the half revolution points at which the clutch is engaged or disengaged, the yoke 22 and the eccentric 20 are in end positions, and that there is no appreciable load upon the clutch either at the time of engagement or disengagement other than the friction of the parts. However, after initial engagement of the bolt in a notch, the transmission of any substantial torque by the clutch acts to draw the bolt radially inward as well as hold the bolt in its radially innermost position.

The lost motion between the lever arm 40 and the spaced walls 44 and 46 of the notch of the side of the bolt, permits free movement and snap action of the bolt independent of the lever 40 to its innermost position, and further provides for snap action of the bolt to its radially outermost position once the lever 40 has been caused to rock to the position as shown in Figure 2.

The arrangement shown provides positive snap action between the bolt and the notched wheel, whereby instantaneous release and instantaneous full engagement are assured under operating conditions. By reason of the construction shown, and particularly the undercutting of the driving face of the notches and the driving face of the bolt, the danger of the bolt making but a partial engagement is eliminated. Such partial engagement would, when the torsional load is applied, tend to cause the bolt to move radially outward, releasing the clutch under load and effecting wear upon the notches and the driving face of the bolt. Such wear manifests itself in rounded corners, tending to render the action impositive, and as such wear increases, the action may become extremely faulty. Through the positive action of the arrangement herein described, the possibility of the bolt disengaging from a notch of the notched wheel, when under load, is eliminated, and the possibility of wear prevented.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A clutch for controlling the to and fro movement of an ironing machine pressing element, comprising in combination, a casing, a shaft journaled therein, a driving member having uniformly spaced peripheral notches mounted on said shaft, a driven eccentric element mounted on said shaft having a face plate adjacent said notched member, a yoke on the eccentric adapted for moving a pressing element to and fro between two end positions on half revolutions of said eccentric, a radial guideway affixed to said plate lying in the plane of said notched member, a bolt slidable in said guideway, said bolt having an end movable into and out of driving engagement with said notches, a control lever eccentrically pivoted on said plate to one side of said guideway, and having operative engagement with said bolt to move the bolt radially in the guideway, resilient means for biasing said lever to move said bolt radially inward, the driving engagement face of said notches and the driving engagement face of said bolt being undercut and inclined with respect to a radius extending through the approximate center of each of said notches when the bolt is engaged in a notch, whereby torque between said notched member and bolt tend to maintain said bolt radially inward, and manually operable stop means mounted on said casing for engaging said lever to cause the same to rock and move said bolt radially out of the path of said notched member, said stop means and lever being coordinated angularly with respect to said eccentric whereby release is effected when the yoke is at an end position, and torque to move the yoke is at a minimum.

2. A clutch for controlling the to and fro movement of an ironing machine pressing element, comprising in combination, a casing, a shaft journaled therein, a driving member having uniformly spaced peripheral notches mounted on said shaft, a driven eccentric element mounted on said shaft, a driven face plate adjacent said notched member, a yoke on the eccentric adapted for moving a pressing element to and fro between two end positions on half revolutions of said eccentric, a substantially radial guideway affixed to said plate lying outwardly of and in the plane of said notched member, a bolt slidable in said guideway, said bolt having an end movable into and out of driving engagement with said notches, a curved control lever eccentrically pivoted on said plate to one side of said guideway and having a substantially radial projecting control arm, and having operative lost motion engagement with said bolt to move the bolt radially in the guideway, resilient means for biasing said lever to move said bolt radially inward, resilient means independent of said lever for urging said bolt radially outward, the driving engagement face of said notches and the driving engagement face of said bolt being undercut and inclined substantially 10° to a radius extending through the approximate center of each of said notches, whereby the driving torque between said notched member and bolt tend to maintain said bolt radially inward, and manually operable stop means mounted on said casing for engaging the control arm of said lever to cause the same to rock and move said bolt radially out of the path of said notched member, said stop means and lever being coordinated angularly with respect to said eccentric whereby release is effected when the yoke is at an end position, and torque to move the yoke is at a minimum.

References Cited in the file of this patent
UNITED STATES PATENTS

| | | |
|---|---|---|
| 1,825,350 | Hill | Sept. 29, 1931 |
| 1,894,242 | Ringer | Jan. 10, 1933 |
| 1,997,682 | Emery | Apr. 16, 1935 |
| 2,056,666 | Geldhof | Oct. 6, 1936 |
| 2,499,954 | Hook | Mar. 7, 1950 |
| 2,511,322 | Bradley | June 13, 1950 |